Nov. 28, 1933.  W. M. BROWER  1,936,932
ELECTRICAL MOTOR
Filed Dec. 5, 1930
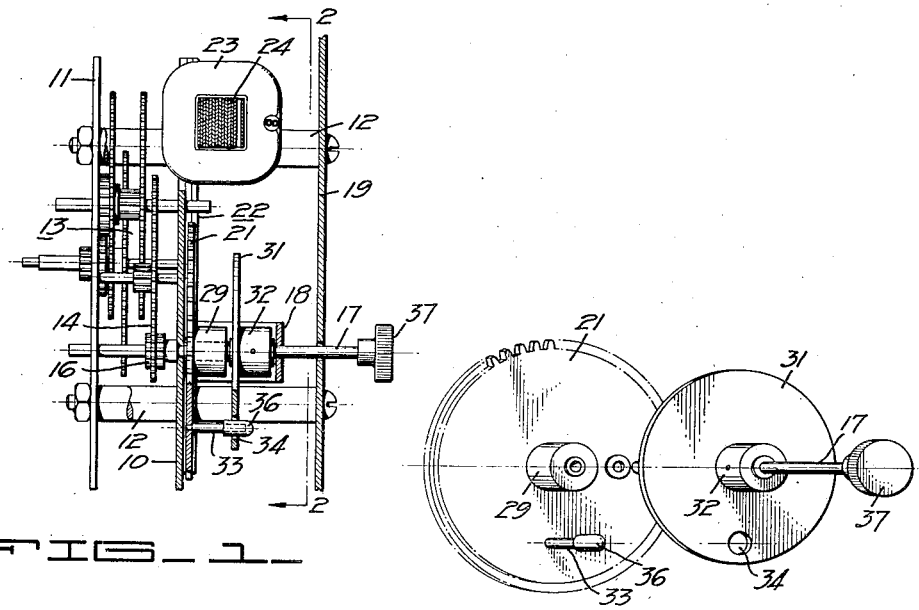
FIG_1_
FIG_2_
FIG_3_
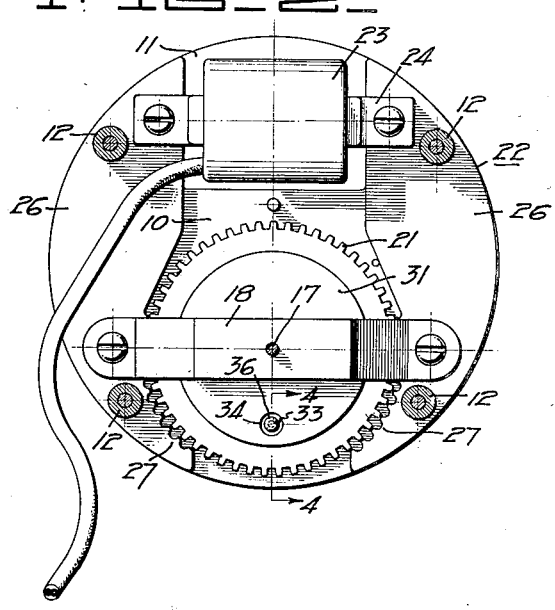
FIG_4_
INVENTOR.
William M. Brower
BY
White, Prost, Fletz & Lothrop
ATTORNEYS.

Patented Nov. 28, 1933

UNITED STATES PATENT OFFICE 1,936,932

ELECTRICAL MOTOR

William M. Brower, Palo Alto, Calif., assignor, by mesne assignments, to Stanford Products, Ltd., San Francisco, Calif., a corporation of California Application December 5, 1930. Serial No. 500,261

6 Claims. (Cl. 172—275)

This invention relates generally to synchronous electrical motors adapted to drive relatively light loads, such as are commonly employed as electrical clock movements. It has particular application to such motors which are non-selfstarting, that is in which the magnetic action upon the rotor will not cause the rotor to start from a position of rest.

In synchronous electrical motors of the above character it has been common in the past to utilize an inertia damping device to facilitate starting. Such an arrangement is disclosed in La Cour Patent 203,423. In placing such a motor in operation the rotor is launched to a speed above synchronism, either manually or otherwise, and is then permitted to coast down to synchronous speed. Upon reaching synchronous speed an exchange of energy occurs between the inertia element of the damping device and the rotor, to cause the rotor to continue in synchronism. Without a damping device the motor would stall upon reaching synchronism and starting would be rendered difficult. In the interest of simplicity, it is desirable to have the load,— represented for example by bearings and gearing in the case of an electrical clock movement—, permanently connected with the rotor. In the past this has imposed certain restrictions upon the design of a proper damping device to secure reliable starting, as with prior motors the impedance forces resisting relative movement between the inertia of the damping device and the rotors were necessarily of greater magnitude than the load friction.

It is an object of the present invention to devise a synchronous motor of the above character having a novel and improved starting means functioning substantially independently of the load.

It is a further object of the invention to devise a novel method of starting a synchronous motor of the above character.

Further objects of the invention will appear from the following description in which the preferred embodiment of the invention has been set forth in detail in conjunction with the accompanying drawing. It is to be understood that the appended claims are to be accorded a range of equivalents consistent with the state of the prior art.

Referring to the drawing:

Figure 1 is a side elevational view, partly in cross section, illustrating a synchronous electrical motor incorporating principles of the present invention.

Fig. 2 is a cross sectional detail taken along the line 2—2 of Fig. 1.

Fig. 3 is a perspective view illustrating certain elements of the motor.

Fig. 4 is an enlarged cross sectional detail taken along the line 4—4 of Fig. 2.

That form of the invention illustrated in the drawing is intended particularly as an electrical clock movement. It consists of metal plates 10 and 11 retained in parallel relationship by the spacer members 12. A speed reducing gear train 13 formed by intermeshing gears and pinions is disposed between these plates, the plates forming journals for the several pivotal shafts of the train. The first gear 14 of the train is driven by a pinion 16 mounted upon shaft 17. One portion of shaft 17 is journaled in a metal strip 18 carried by plate 10, while another portion is journaled within plate 11 as shown in Fig. 1. The assembly of parts mounted upon plates 10 and 11, can be carried by a suitable supporting plate 19.

The electrical elements of the motor are of conventional construction and consist of a toothed rotor 21 made of suitable magnetic material, and a stator 22. The stator includes the winding 23 adapted to be connected with available alternating current sources, as for example the ordinary commercial 60 cycle alternating current lines, and this winding is disposed upon a magnetic core 24. The ends of core 24 are magnetically coupled to the magnetic pole pieces 26. These pole pieces 26 have toothed portions 27 adapted to normally lie in close proximity with the toothed peripheral portion of rotor 21. With such an arrangement of electrical elements the rotor will operate at a given synchronous speed dependent upon the frequency of the current supply. However the rotor is not self-starting, and without the use of additional means such as will be presently described, starting by manually whirling the rotor to synchronous speed is a difficult operation.

In the past it has been conventional practice to directly connect the magnetic rotor with the main shaft which drives the gear train or other load, which in this case corresponds to shaft 17. As distinguished from such prior practice, I have shown the rotor 21 mounted upon a central hub 29, which in turn is journaled upon shaft 17. Obviously such a connection between the rotor and the shaft 17 permits freedom of angular movement between the rotor and shaft 17, but such movement is opposed by the slight frictional forces occasioned by the bearing. In addition to the rotor, shaft 17 also carries an inertia element in the form of a wheel 31 having considerable mass. This wheel is shown mounted upon a hub 32, which in turn is fixed to shaft 17.

With the construction described above relative angular movement of rotor 21 relative to shaft 17, permitted because of the journaling of this rotor, necessarily means a freedom of movement between the rotor and the inertia element or wheel 31. For reasons which will be presently apparent, it is desirable that this freedom of movement be limited. For this purpose a relatively rigid pin 33 is shown projecting from one face of rotor 21. The outer end of this pin projects thru an aperture 34 formed in inertia wheel 31. To prevent chattering between the wheel and pin 33, it is desirable that that portion of the pin projecting thru opening 31 be covered by a buffer 36 of resilient material such as soft vulcanized rubber, cork, fabric, or the like. Opening 34 is of such a diameter that there is a limited amount of lost motion or freedom between the inertia wheel 31 and the rotor.

As a means for launching the rotor to a speed above synchronism it is convenient to provide one end of shaft 17 with a knob 37, which can be readily engaged by the fingers of an operator.

Before describing the mode of operation of my invention, it may be pointed out that the friction occasioned by gear train 13, the parts which the gear train may drive, and by the bearings for shaft 17, constitutes what can be termed the load for the motor. In other words there is a certain amount of load friction which the rotor must drive during its normal operation, and this load friction is predetermined in the case of an electrical clock movement or similar mechanism. As previously explained there is also a certain amount of friction in the journal connection for the rotor about shaft 17, but this friction is relatively slight as compared to the load friction. In starting the motor in operation, current is applied to winding 23, and knob 37 whirled by an operator to launch the rotor 21 to some speed above synchronism. Because of its rigid connection with the shaft inertia element 31 is also set in rotation and the energy stored in this element serves to carry the load while the rotating parts are coasting down to normal operating speed. During this coasting rotor 21 rotates substantially in unison with inertia element 31 and shaft 17. As the speed of the rotor decreases to at or about the normal speed of synchronism, it tends to stall but such a tendency is overcome by an exchange of a slight amount of energy between the rotor and inertia element 31. This exchange of energy occurs by virtue of slight relative movements which take place between these parts, which relative movement is opposed by the slight frictional forces formed by the journaling of rotor 21 upon shaft 17. About the time the rotor becomes synchronized it drives wheel 31 at synchronous speed thru pin 33, and thus automatically takes up the load which has previously been carried by the inertia wheel.

From the above outlined method utilized in the starting of my motor, it is apparent that for the momentary period during synchronization the rotor does not carry the load, and therefore the forces required to effect synchronization are independent of the load. Therefore the same arrangement of rotor, inertia element and mechanical impedance opposing freedom of movement between the rotor and the inertia element, is adaptable for a variety of loads, and the design of a motor to suit particular load conditions is materially simplified.

In explanation of the appended claims it may be explained that the journal for the rotor upon shaft 17 and the lost motion connection between the rotor and the wheel 31 formed by pin 33, can be considered as means forming a connection between the rotor and the inertia element which permits a limited freedom of movement between the inertia element and the rotor but which causes such movement to be opposed by slight mechanical impedance. By the term "mechanical impedance" I have referece to either friction alone or friction combined with resilience (such as a spring) to secure the desired results.

I claim:

1. In a synchronous electrical clock motor adapted to operate from commercial alternating current lines, a rotatable shaft adapted to be permanently connected to a load, a rotatable inertia element having a substantially rigid connection with said shaft and rotatable therewith, a magnetic rotor adapted to be magnetically driven at a given synchronous speed dependent upon frequency of the current supply, means forming a connection between the rotor and said inertia element which permits a limited freedom of movement between said inertia element and said rotor but which causes such movement to be opposed by mechanical impedance relatively slight compared to the load friction, and means for momentarily whirling the shaft to launch the rotor to a speed above its speed of synchronism, whereby the rotating inertia element serves to carry the load while the rotor is coasting to synchronous speed, after which the rotor drives the load.

2. In a synchronous electrical clock motor adapted to operate from commercial alternating current lines, a rotatable shaft adapted to be permanently connected to a load, an inertia element rigidly connected to said shaft to rotate together with the same, a non-self-starting magnetic rotor adapted to be magnetically driven at a given synchronous speed dependent upon the frequency of the current supply, means forming a connection between the rotor and said inertia means which permits a limited freedom of movement between said inertia means and said rotor but which causes such movement to be opposed by mechanical impedance relatively slight compared to the load friction, and means for momentarily whirling the shaft to launch the rotor to a speed above its speed of synchronism, whereby the inertia means serves to carry the load while the rotor is coasting to synchronous speed, after which the rotor drives the load.

3. In a synchronous electrical clock motor adapted to operate from commercial alternating current lines, a rotatable shaft adapted to be permanently connected to a load, an inertia element having a substantially rigid connection with said shaft to rotate together with the same, a non-self-starting magnetic rotor adapted to be magnetically driven at a given synchronous speed dependent upon the frequency of the current supply, said rotor being disposed substantially concentric with respect to said shaft, means forming a connection between the rotor and said inertia element which permits a limited freedom of movement between said rotor and said inertia element but which causes such movement to be opposed by mechanical impedance relatively slight compared to the load friction, and means for momentarily whirling the shaft to launch the rotor to a speed above its speed of synchronism, whereby the rotating inertia element serves to carry the load while the rotor is coasting to synchronous speed, after which the rotor drives the load.

4. In a synchronous electrical motor adapted to operate from commercial alternating current lines, a rotatable shaft adapted to be permanently connected to a load, a rotatable inertia element having a substantially rigid connection with said shaft to rotate with the same, a non-self-starting magnetic rotor adapted to be magnetically driven at a given synchronous speed dependent upon the frequency of the current supply, means forming a connection between the rotor and said inertia element, said means including a lost motion connection permitting a limited freedom of movement between the motor and the inertia element and a bearing which causes such movement to be opposed by frictional forces relatively slight compared to the load friction, and means for momentarily whirling the shaft to launch the rotor to a speed above its speed of synchronism, whereby the inertia element serves to carry the load while the rotor is coasting to synchronous speed, after which the rotor drives the load.

5. In a synchronous motor having a dentate field plate and a dentate rotor, a shaft and means for connecting it to a load, said rotor being mounted on the shaft free to turn thereon through an angle greater than half the angular distance between adjacent teeth, and a drive connection between the rotor and the shaft engageable at the limits of such turning movement.

6. In a synchronous motor having a dentate field plate and a dentate rotor, a shaft and means for connecting it to a load, said rotor being mounted on the shaft free to turn thereon through an angle greater than half the angular distance between adjacent teeth, a drive connection between the rotor and the shaft engageable at the limits of such turning movement, and a fly-wheel fixed to said shaft.

WILLIAM M. BROWER.